(12) United States Patent
Kesch et al.

(10) Patent No.: US 7,594,389 B2
(45) Date of Patent: Sep. 29, 2009

(54) METHOD FOR DIAGNOSING A SECONDARY-AIR SYSTEM OF AN INTERNAL COMBUSTION ENGINE

(75) Inventors: Bernd Kesch, Hemmingen (DE); Detlef Heinrich, Ludwigsburg (DE); Achim Guenther, Sindelfingen (DE); Christof Thiel, Heilbronn (DE); Juergen Foerster, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 598 days.

(21) Appl. No.: 11/029,240

(22) Filed: Jan. 3, 2005

(65) Prior Publication Data
US 2005/0150209 A1    Jul. 14, 2005

(30) Foreign Application Priority Data
Jan. 8, 2004    (DE) ................. 10 2004 001 330

(51) Int. Cl.
*F01N 3/00*    (2006.01)
(52) U.S. Cl. ............................ 60/277; 60/274; 60/289; 60/290
(58) Field of Classification Search ............. 60/277, 60/289, 300
See application file for complete search history.

(56) References Cited

U.S. PATENT DOCUMENTS

| | | | | |
|---|---|---|---|---|
| 5,404,719 A | * | 4/1995 | Araki et al. | 60/276 |
| 5,706,653 A | * | 1/1998 | Shoji et al. | 60/276 |
| 6,029,441 A | * | 2/2000 | Mizuno et al. | 60/274 |
| 6,463,732 B2 | * | 10/2002 | Baeuerle et al. | 60/274 |
| 6,637,191 B1 | * | 10/2003 | Ziemba et al. | 60/274 |
| 2003/0074891 A1 | * | 4/2003 | Tamura et al. | 60/284 |

FOREIGN PATENT DOCUMENTS

DE    199 52 836    4/2001

* cited by examiner

*Primary Examiner*—Binh Q Tran
(74) *Attorney, Agent, or Firm*—Kenyon & Kenyon LLP

(57) ABSTRACT

A method for diagnosing a secondary-air system of an internal combustion engine. The secondary-air system introduces secondary air into the exhaust-gas region of the internal combustion engine, the secondary air exothermically reacting together with combustible exhaust-gas components, and a thermoreactor being formed in the reaction region. The method provides for a measure of the secondary air to be ascertained from the thermal behavior in the thermoreactor and evaluated. The measure of the secondary air, which reflects, for example, the volumetric flow rate of the secondary air, the mass flow rate of the secondary air, or the amount or mass of secondary air flowing in a time interval, is compared to at least one threshold value. At least one diagnostic signal is then generated as a function of the comparison result.

1 Claim, 1 Drawing Sheet

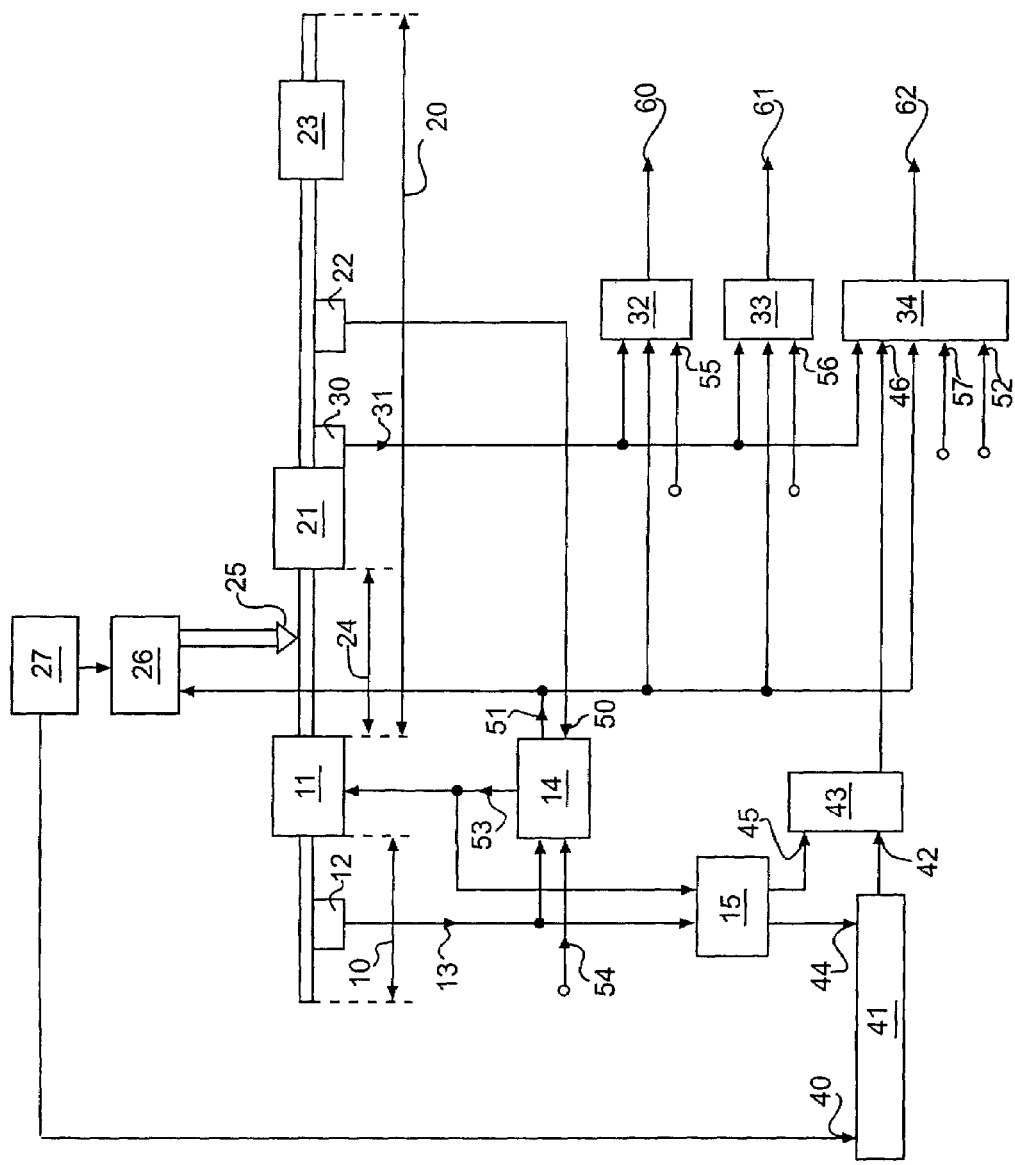

METHOD FOR DIAGNOSING A SECONDARY-AIR SYSTEM OF AN INTERNAL COMBUSTION ENGINE

BACKGROUND INFORMATION

German Patent No. DE 199 52 836 describes a method where the mass flow rate of secondary air is arithmetically determined as a function of the ratio of the intake-air flow rate to the fuel flow rate of the internal combustion engine, and as a function of the signal provided by a lambda sensor and the signal provided by an air sensor for the intake air. The evaluation of the secondary-air system is subsequently carried out as a function of the calculated mass flow rate of secondary air.

The known method assumes that the signal of the lambda sensor is available. Therefore, the known method cannot be used to carry out a diagnosis in the starting phase of the internal combustion engine, while the lambda sensor heats up to its operating temperature.

An emission control system situated in the exhaust system of an internal combustion action, e.g. a catalytic converter, generally requires a minimum operating temperature, which can be reached during the heating phase of the internal combustion engine, using a heating measure. A possible heating measure provides for combustible exhaust-gas components and secondary air to be introduced into the exhaust-gas region upstream from the emission control system, the combustible exhaust-gas components and secondary air exothermically reacting with each other and heating the exhaust gas.

An object of the present invention is to provide a method for diagnosing a secondary-air system of an internal combustion engine, which is independent of the signal of a lambda sensor.

SUMMARY OF THE INVENTION

The procedure of the present invention for diagnosing a gasoline-engine secondary-air system, which introduces secondary air into the exhaust-gas region of the internal combustion engine, where the secondary air exothermically reacts with combustible exhaust-gas components to form a thermoreactor in the reaction region, provides that a measure of the secondary air is ascertained from the thermal behavior in the thermal reactor and evaluated. The measure of the secondary air is compared to at least one threshold value. At least one diagnostic signal is subsequently generated as a function of the comparison result.

The term "thermoreactor" used in the present application designates a region in the exhaust-gas system of the internal combustion engine, in which an exothermic reaction of combustible exhaust-gas components with the introduced, secondary air takes place. Therefore, the term "thermoreactor" is not to be understood as a specific component. However, a component of the exhaust-gas system, for example the exhaust manifold, may be specially designed. Such a design relates to, e.g. a specific, developed geometry for directing exhaust gas, which allows the combustible exhaust-gas components to effectively mix with the secondary air. The exothermic reaction may take place with or without flame formation, depending on the boundary conditions. In general, the exhaust-gas temperature attainable in the case of flame formation is higher than that without flame formation. It has been experimentally determined that the difference may be up to 150° C.

The procedure of the present invention has the advantage that a diagnosis of the secondary-air system may be carried out nearly simultaneously to the heating effect.

The method of the present invention ensures that the boundary conditions for forming a thermoreactor are maintained. The boundary conditions are, in particular, to maintain a predetermined fraction of combustible exhaust-gas components with respect to the introduced secondary air, as well as to maintain effective mixing of the combustible exhaust-gas components with the introduced secondary air. When the boundary conditions are not satisfied due to an insufficient amount of secondary air, then either a defective thermoreactor is formed or no thermoreactor is formed at all, so that the required heating power or heat energy cannot be provided. Therefore, in the extreme case, an exothermic reaction does not occur at all, with the result that unburned exhaust-gas components may be produced.

The measure of the secondary air may reflect, for example, the volumetric flow rate of secondary air, the mass flow rate of secondary air, and/or the amount or mass of secondary air appearing in a time interval.

One refinement provides for the thermal behavior in the thermoreactor to be ascertained from a measure of the temperature in the thermoreactor. The measure of the temperature is obtained in a particularly simple manner by measuring the temperature in the thermoreactor and/or in the exhaust-gas stream, downstream from the thermoreactor.

The measure (standard) for evaluating the secondary air may be obtained from an evaluation of the curve of temperature versus time. It is suitable to determine the gradient or the difference quotient of the temperature curve. Then, a comparison to a gradient threshold value is preferably made.

In the simplest case, the standard for evaluating the secondary air may be directly obtained from the ascertained temperature, by comparing it to a temperature threshold value. The exceeding of a predetermined temperature threshold value may be used as an indication that the thermoreactor is formed, so that it is possible to deduce the proper measure of the secondary air.

Another option for obtaining a measure of the secondary air is to ascertain a measure of the quantity of heat generated in the thermoreactor. Then, a comparison with a heat-quantity threshold value is preferably made. The quantity of heat may be determined as a time integral over the exhaust-gas stream (exhaust-gas flow rate), multiplied by the heat capacity of the exhaust gas, and multiplied by the measured temperature. The exhaust-gas stream is obtained from the known air signal; if desired, a fuel signal additionally being considered. In a model, the secondary air or the secondary-air flow rate is calculated from the operating voltage of the secondary-air pump and, if desired, from the counterpressure as well. The exhaust-gas counterpressure may be obtained from the air signal, the fuel signal again being optionally considered.

One measure provides for the combustible exhaust-gas components to be produced inside the engine by operating the internal combustion engine with a lack of air. The air-fuel mixture may be reduced to an air ratio, lambda, in the range of less than 1 down to 0.6, in particular while the internal combustion engine is idling.

BRIEF DESCRIPTION OF THE DRAWINGS

The FIGURE shows a block diagram of an internal combustion engine having a secondary-air system, in whose environment a method of the present invention is executed.

DETAILED DESCRIPTION

Positioned in intake region 10 of an internal combustion engine 11 is an air sensor 12, which transmits an air signal 13 to both an engine control unit 14 and an engine exhaust-gas flow rate determination unit 15. A region in which a thermoreactor 21 may be formed is identified in exhaust-gas system 20 of internal combustion engine 11. In addition, an exhaust-gas sensor 22 and an emission control system 23 are situated in exhaust-gas system 20. Secondary air 25 is introduced into the exhaust gas in an exhaust-gas region 24, which is situated between internal combustion engine 11 and thermoreactor 21. Secondary air 25 is provided by a secondary-air pump 26, which is powered with electrical energy from an energy source 27.

Positioned in the region of thermoreactor 21 is a temperature sensor 30, which transmits a temperature signal 31 to a gradient signal processor 32, a temperature signal processor 33, and a heat-quantity signal processor 34.

Energy source 27 transmits a voltage signal 42 to a secondary-air calculation unit 41, which also receives an exhaust-gas pressure signal 44 generated by engine exhaust-gas flow rate determination unit 15. Secondary-air calculation unit 41 ascertains a secondary-air signal 42 that is transmitted to an adder 43, which adds secondary-air signal 42 to an engine exhaust-gas flow rate signal 45 provided by engine exhaust-gas flow rate determination unit 15 and passes on the result as total exhaust-gas signal 46.

Exhaust-gas sensor 22 transmits an exhaust-gas signal 50 to engine control unit 14. Engine control unit 14 controls secondary-air pump 26, using a secondary-air control signal 51, which is also supplied to gradient signal processor 32, temperature signal processor 33, and heat-quantity signal processor 34. Heat-quantity signal processor 34 also receives an exhaust-gas heat capacity signal 52. The engine control unit transmits a fuel signal 53 to both internal combustion engine 11 and engine exhaust-gas flow rate determination unit 15. Furthermore, engine control unit 14 receives a setpoint signal 54.

Gradient signal processor 32 additionally receives a gradient threshold value 55 and generates a first diagnostic signal 60. Temperature signal processor 33 additionally receives a temperature threshold value 56 and generates a second diagnostic signal 61. Heat-quantity signal processor 34 additionally receives a heat-quantity threshold value 57 and generates a third diagnostic signal 62.

The method of the present invention functions as follows:

Engine control unit 14 sets fuel signal 53 as a function of setpoint signal 54 and/or air signal 13 and/or exhaust-gas signal 50. In addition, a speed signal of engine 11 not shown in further detail, as well as other signals not shown, may also be considered. Fuel signal 53 sets the amount of fuel to be supplied to internal combustion engine 11. Air signal 13 provided by air sensor 12 indicates, for example, the volumetric flow rate of air or the mass flow rate of air that reaches engine 11. Exhaust-gas signal 50, which is provided by a suitably designed exhaust-gas sensor 23, reflects, for example, the air ratio, lambda, and/or the NOx concentration in the exhaust gas of internal combustion engine 11. Emission control system 23 removes unwanted components from the exhaust gas. Emission control system 23 includes, for example, at least one catalytic converter and/or a particle filter.

Emission control system 23 generally requires a minimum operating temperature, which, in view of the increasingly strict emissions legislation, should be reached as rapidly as possible after ignition of engine 11. An option for heating emission control system 23 provides for the exhaust gas reaching emission control system 23 to be heated. Provided is the introduction of combustible exhaust-gas components and secondary air 25 into exhaust-gas region 24. The exothermic reaction of the two components forms thermoreactor 21. In this case, it is assumed that there is a minimum mixture temperature necessary for ignition. Therefore, thermoreactor 21 should preferably be formed in direct proximity to internal combustion engine 11.

The combustible exhaust-gas components may be introduced into exhaust-gas region 24, downstream from engine 11. In another embodiment, the combustible exhaust-gas components are provided in engine 11 by running engine 11 with a lack of air. The air ratio, lambda, of the air-fuel mixture may be reduced to 0.6-0.9, in particular while internal combustion engine 11 is idling. However, the exhaust-gas temperature is low during idle, so that an effective heating measure is particular necessary during idle.

A diagnosis of the secondary-air system of engine 11, which includes at least secondary-air pump 26 and the air duct leading to exhaust-gas region 24, is possible by ascertaining and evaluating a measure of secondary air 25 from the thermal behavior in thermoreactor 21. The measure of secondary air 25 may reflect, for example, the volumetric flow rate of secondary air, the mass flow rate of secondary air, and/or the amount or mass of secondary air appearing in a time interval.

In the simplest case, the thermal behavior in thermoreactor 21 may be derived from a measure of the temperature in thermoreactor 21. The temperature in thermoreactor 21 is preferably measured by temperature sensor 30. Temperature sensor 30 may be situated, for example, at a suitable location in thermoreactor 21. A particularly suitable mounting location of temperature sensor 30 is downstream from thermoreactor 21.

A simple option for ascertaining the measure of secondary air 25 is possible on the basis of the measurement and evaluation of the temperature in thermoreactor 21 by temperature signal processor 33, which may be activated by secondary-air control signal 51. Temperature signal processor 33 compares temperature signal 31 to temperature threshold value 56, which is set to a minimum temperature. Temperature threshold value 56 may be corrected, using the ambient temperature. If temperature threshold value 55 is not reached, then temperature signal processor 33 emits second diagnostic signal 61, which indicates that the minimum temperature was not reached. The measure of secondary air 25 may be deduced from this. According to this, the measure of secondary air 25 is indirectly evaluated via the temperature in thermoreactor 21, by comparing it to temperature threshold value 56, second diagnostic signal 61 being generated in response to temperature threshold value 56 not being exceeded.

Another option for ascertaining the measure of secondary air 25 is given on the basis of an evaluation of a time characteristic of the temperature in thermoreactor 21 by gradient signal processor 32, which may also be activated by secondary-air control signal 51. Gradient signal processor 32 determines the temperature gradient or the temperature-difference quotient. If the gradient threshold value or quotient threshold value 55 is not reached, then gradient signal processor 32 outputs first diagnostic signal 60, which indicates that a necessary minimum temperature gradient or a particular minimum temperature difference quotient was not reached. The measure of secondary air 25 may again be deduced from this. Accordingly, the measure of secondary air 25 is indirectly measured and evaluated via the curve of temperature versus time in thermoreactor 21.

Another option for determining the measure of secondary air 25 is possible based on an evaluation of the quantity of heat generated in or downstream from thermoreactor 21, using heat-quantity signal processor 34. The quantity of heat is ascertained from the time integral over the total exhaust-gas stream, which is represented by total exhaust-gas signal 46, multiplied by the exhaust-gas heat capacity, which is represented by exhaust-gas heat capacity signal 52, and multiplied by the measured temperature, which is represented by temperature signal 31.

In engine exhaust-gas flow rate determination unit 15, the engine exhaust-gas flow rate is obtained from air signal 13, fuel signal 53 optionally being taken into consideration. Engine exhaust-gas flow rate determination unit 15 outputs engine exhaust-gas flow rate signal 45 as a measure of the engine exhaust-gas flow rate.

Using a model, the secondary-air flow rate, which is represented by secondary-air signal 42, may be calculated from the operating voltage of secondary-air pump 26 represented by voltage signal 40, and from the exhaust-gas counterpressure. In engine exhaust-gas flow rate determination unit 15, the exhaust-gas counterpressure is obtained from air signal 13, fuel signal 53 optionally being taken into consideration again. Secondary-air signal 42 and engine exhaust-gas flow rate signal 45 are added in adder 43 and supplied to heat-quantity signal determination unit 34 as total exhaust-gas signal 46.

After the integral is calculated, the result is preferably compared to heat-quantity threshold value 57. If the integral falls below heat-quantity threshold value 52, then heat-quantity signal determination unit 34 generates third diagnostic signal 62. Therefore, the measure of secondary air 25 may be deduced again with the aid of heat-quantity signal determination unit 34. Thus, the measure of secondary air 25 is indirectly measured and evaluated via the quantity of heat attained in thermoreactor 21, the quantity of heat being a function of a measure of the temperature in thermoreactor 21.

One or more of the described methods or, if desired, further methods not described in further detail may be simultaneously used for ascertaining the measure of secondary air 25 and evaluating the measure.

What is claimed is:

1. A method for diagnosing a secondary air system of an internal combustion engine, which introduces secondary air into an exhaust-gas region of the engine, the secondary air exothermically reacting together with combustible exhaust-gas components, and thermoreactor being formed in a reaction region, the method comprising:

ascertaining and evaluating a measure of the secondary air from a thermal behavior in the thermoreactor;

comparing the measure of the secondary air to at least one threshold value; and generating at least one diagnostic signal as a function of a comparison result, wherein the measure of the secondary air is obtained from one of a gradient and a difference quotient of the temperature curve.

* * * * *